May 13, 1958 M. A. CARTER 2,834,928

ELECTRONIC DEVICE FOR CONTROLLING RECORD TAPES

Filed Nov. 19, 1956 2 Sheets-Sheet 1

INVENTOR.
MELVIN A. CARTER
BY
J. B. Felshin
ATTORNEY.

ELECTRONIC DEVICE FOR CONTROLLING RECORD TAPES

Filed Nov. 19, 1956 2 Sheets-Sheet 2

INVENTOR.
MELVIN A. CARTER
BY J. B. Felshin
ATTORNEY.

United States Patent Office 2,834,928
Patented May 13, 1958

2,834,928

ELECTRONIC DEVICE FOR CONTROLLING RECORD TAPES

Melvin A. Carter, New York, N. Y.

Application November 19, 1956, Serial No. 623,239

18 Claims. (Cl. 318—162)

My invention relates to devices for controlling record tapes and is directed particularly to an electronic device for automatically controlling starting and stopping of continuous record tapes.

In one commonly used type of continuous recording tape, the tape is wound within a cylindrical reel or magazine with an outwardly extending loop interconnecting the inner and outer ends of the continuous record tape. In use, the tape magazine is held stationary while the loop is driven forward over a capstan past the usual recording, erasing and playback heads. The winding of tape on the magazine is thus continuously pulled around its central support while the tape is in operation. It is known to apply a conductive coating, such as graphite, for example, to the back of such endless tapes to lessen the sliding friction in the magazine.

It is one object of my invention to utilize the conductive property of the conductive material on tapes of the above nature in association with an electronic motor control circuit for automatically controlling the starting and stopping of the tape.

It is another object of my invention to provide a tape control device of the character described wherein tape travel is stopped upon an interruption of an electronic circuit passing transversely through a conductive tape, the interruption being effected by the provision of a short notch in the tape.

It is another object of my invention to provide a tape control device of the character described, having a remotely controllable switch that can be used to start the tape again for another cycle of operation.

It is still another object of my invention to provide a tape control device of the character described, including selective means for automatically recycling the stopped tape after one, selectively, of a plurality of different time intervals.

Another object is to provide a tape controlling device of the above nature which will be easy to install and operate, low in cost, and fool-proof and long-wearing in operation.

Other objects, features and advantages of my invention will be apparent from the following description when read with reference to the accompanying drawings wherein.

Figure 1:
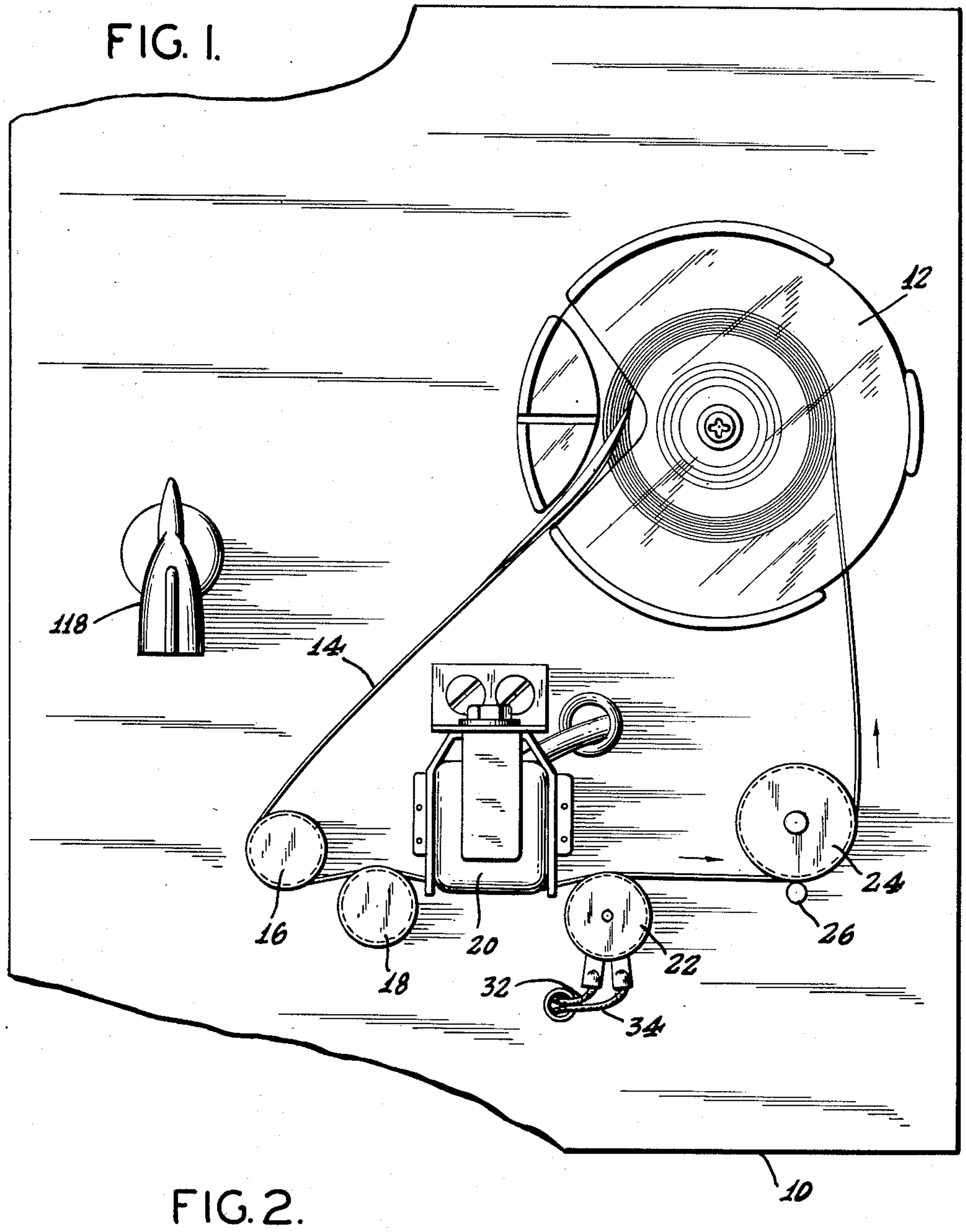
Fig. 1 is a top view of a recorder device embodying my invention.

Referring now to the drawings, wherein like reference numerals denote corresponding parts throughout the several views, and referring first to Fig. 1, the numeral 10 denotes a support panel upon which is secured in fixed position a tape magazine 12 carrying a continuous recording tape 14. The external loop of the tape 14 is guided over fixed posts 16 and 18 past a pick-up and/or recorder head 20, whence is passes over guide member 22, around friction roller 24 and back to the tape magazine 12. A capstan roller 26 driven by a motor 27 (Fig. 3) below the support panel 10 is spring-pressed against the tape to drive the tape around the friction roller 24 in the direction indicated by the arrows. As tape is thus pulled from the left-hand side of the tape magazine 12 from the inside end of the amount of tape coiled therein, the tape rewinds again around the outside of the coil so that continuous motion of the tape past the head 20 is effected. In order to minimize sliding friction in the tape as it coils through the magazine 12, the rear surface of the tape is coated with an anti-friction substance which is electrically conductive.

Figure 2:
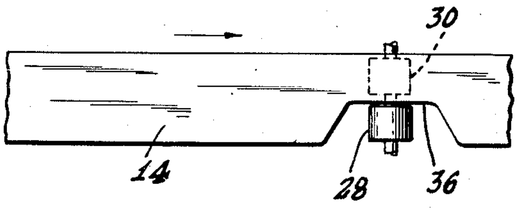
Fig. 2 is an elevational view of the tape switch device used in association with the conductive tape to actuate the tape control circuit.
Figure 3:
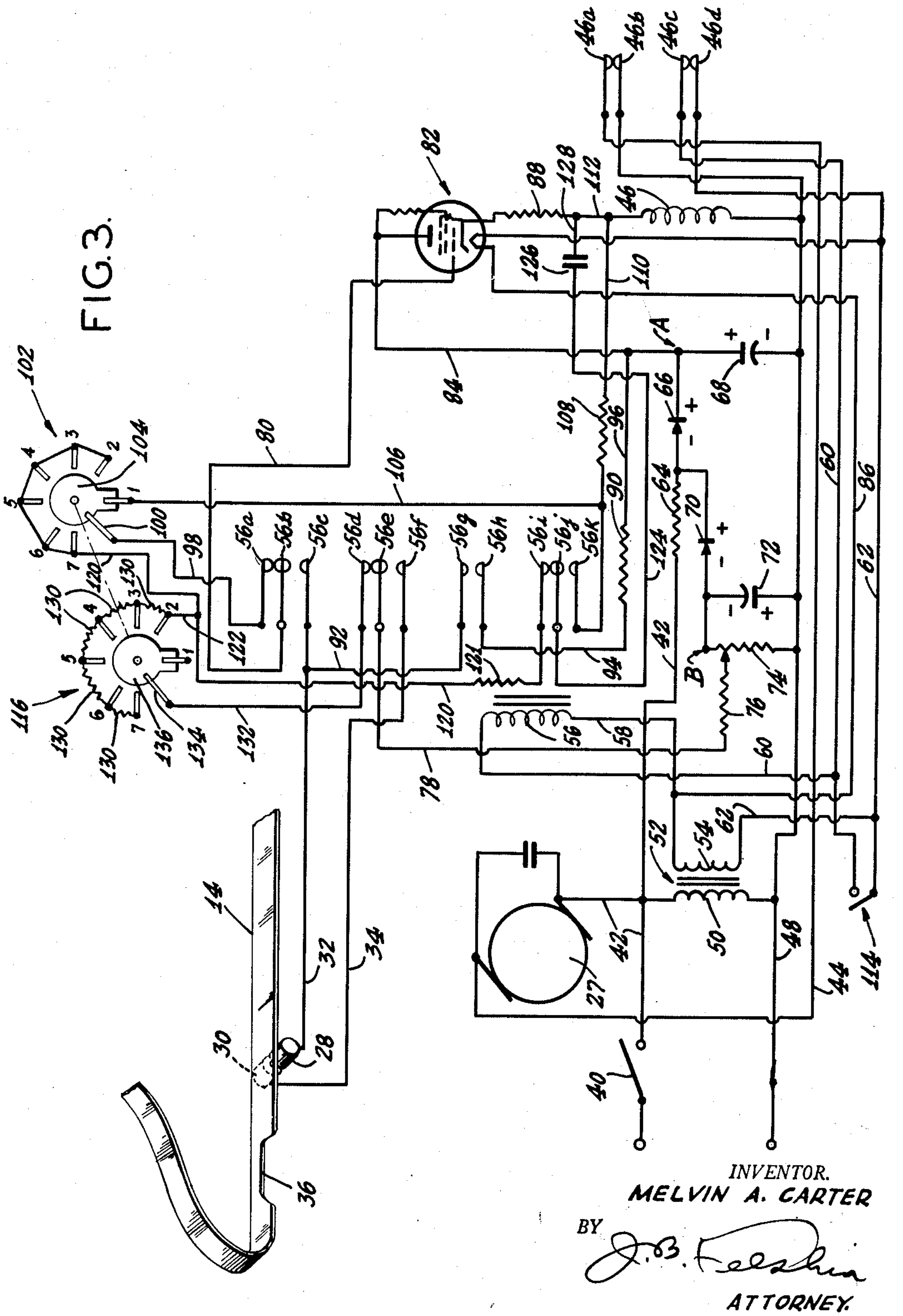
Fig. 3 is an electrical schematic diagram of the tape drive circuit.

As seen in Fig. 2, guide member 22 is comprised of two cylindrical metallic switch elements 28, 30 secured in spaced alignment transverse to the tape. The switch elements 28, 30 are electrically insulated from each other and connected to respective conductor leads 32, 34 (Fig. 3). The tape 14 is provided with an indexing notch 36 at one side which is operative, when passing switch elements 28, 30 in the guide member 22, to open-circuit the electrical connection normally afforded between said elements by the conductive back of the tape. Notch 36 may be replaced by non conductive material or by an interruption in the conducted material.

Considering now the operation of the control circuit and referring to Fig. 3, it will be seen that the tape drive motor 27, which preferably is a hysteresis type motor, upon closure of main switch 40, is energized through lead 42 connecting to one terminal of the source of A.-C. power and through lead 44, normally closed relay switch contacts 46*a*, 46*b* and lead 48 to the other terminal of the A.-C. source of power. The drive motor 27 will thus operate as long as the switch 46*a*, 46*b* controlled by relay coil 46, is in de-actuated condition.

Closure of the main switch 40 also connects the primary 50 of transformer 52 to the source of A.-C. power through leads 42 and 48, whereby the 6 volt output winding 54 thereof will be connected to energize relay winding 56 through lead 58, lead 60, normally-closed switch contacts 46*c*, 46*d* and lead 62.

Closure of the main power switch 42 also serves to energize, through leads 42 and 48, a source of positive potential comprising resistor 64, half-wave rectifier 66 and condenser 68, whereby a D.-C. voltage of positive potential with respect to lead 48 is supplied at point A, and a source of negative potential comprising the common resistor 64, half-wave rectifier 70 and condenser 72 shunted by a voltage divider potentiometer 74 to provide at point B a D.-C. voltage of negative potential with respect to lead 48.

Controlled by relay winding 56 are a single-pole double-throw switch 56*a*, 56*b*, 56*c*, contact arms 56*a* and 56*b* being in contact when the relay is in de-actuated condition, a single-pole double-throw switch 56*d*, 56*e*, 56*f*, contact arms 56*d* and 56*e* being in contact when the relay is in de-actuated condition, a single-pole single-throw switch 56*g*, 56*h*, open-circuited when the relay is in de-actuated condition, and a single-pole double throw switch 56*i*, 56*j*, 56*k*, contact arms 56*i* and 56*j* of which are in contact when the relay is de-actuated. Thus, when the relay becomes energized as described above, its switches are actuated so that contact arms 56*b* and 56*c* make contact while switch contact arms 56*a* and 56*b* break contact, contact arms 56*e* and 56*f* make contact while switch contact arms 56*d* and 56*e* break contact, contact arms 56*g* and 56*h* make contact, and contact arms 56*j* and 56*k* make contact while switch contact arms 56*i* and 56*j* break contact. While the tape 14 is moving, therefore, a negative potential will be applied from voltage potentiometer 74, through limiting resistor 76, lead 78, now closed switch contacts **56*e*, 56*f*, lead 34, across the switch elements 28, 30, through the conductive tape, through lead 32, now-closed switch contacts 56*b*, 56*c*, and lead 80 to the grid of a pentode control tube 82. The screen and plate of pentode 82 are fed from the source of positive voltage supply at point A through lead 84. The heater element of pentode 82 is energized from the secondary winding 54 of the 6 volt transformer 52 through leads 62 and 86. The cathode of pentode 82 is connected in series with a cathode resistor 88 and the relay winding 46 to lead 48, which constitutes the ground potential terminal of the D.-C. positive voltage source for said pentode. Because of the negative potential being applied to the control grid of pentode 82 as described above, the tube is at cut-off and the relay winding 46 thus remains de-energized. Relay switch contacts 46*a*, 46*b* thus remain close-circuited so that the tape drive motor 27** continues to be energized to move the tape through a complete cycle of operation, as is hereinbelow more fully described.

Means is provided to limit the negative potential being applied to the grid of the pentode 82 from going too far below cut-off value, the same comprising a resistor 90 being connected between lead 34 and the source of positive voltage potential at point A through now-closed switch contacts **56*g*, 56*h* through leads 92, 94, 96 and 84**.

When the tape has completed its cycle of travel and the indexing notch 36 thereof reaches a position between the switch elements 28, 30, the above-described circuit conducting the source of negative potential to the grid of the pentode 82 will be open-circuited, so that the pentode will begin to conduct through the relay 46 in its cathode circuit, whereupon the relay switches **46*a*, 46*b* and 46*c*, 46*d* will be actuated to open circuit. Open-circuiting of switch 46*a*, 46*b* will open the above-described energization circuit for the tape motor 27, whereupon the motor and tape will stop and coast so that the tape notch will come to rest just beyond the switch elements 28, 30. Open-circuiting of switch 46*c*, 46*d* will open the above-described energization circuit for relay winding 56, whereupon its switch contacts will again assume their de-actuated positions, as illustrated. Thus the grid of pentode 82 will be connected through lead 80, now-closed switch contacts 56*a*, 56*b*, lead 98, rotor contact 100 of a rotary timer switch member 102, rotor 104 thereof, lead 106, resistor 108, and lead 110 to the interconnection lead 112 joining the cathode resistor 88 and the relay winding 46. The grid of the pentode 82** is thus kept at a potential sufficient to insure conduction.

Another cycle of tape operation can now be started only by closing a remote momentarily actuated switch 114, connected with leads 60 and 62, assuming that the timer comprising the rotary timer switch member 102 is in position 1, as illustrated. Closure of remote switch 114 again energizes control relay winding 56 from transformer secondary winding 54 through lead 58 and lead 60, closed switch 114 and lead 62.

The timer comprises, in addition to the rotary switch member 102, a rotary switch member 116 ganged thereto and provided with a control handle 118 (Fig. 1) for moving said timer selectively to one of its seven positions 1 through 7. Switch contact positions 2 through 7 of switch member 102 are interconnected by leads 120 and 122 to switch contact position 2 of switch member 116. Lead 120 is also connected with switch contact **56*i* through a time delay resistor 121, and associated switch contact 56*j* is connected by lead 124 to one terminal of a charging condenser 126, the other terminal of which is connected by lead 128 to lead 112 interconnecting series-connected cathode resistor 88 and cathode relay coil 46. Timing resistors 130 are connected in series between the contact positions 2 and 7 of the rotary switch member 116**.

The operation of the timing device in automatically recycling the tape drive a predetermined interval is as follows: Upon de-energization of control relay winding 56 upon completion of a cycle of operation as hereinabove described, a source of negative voltage potential will be applied from potentiometer 74, through resistor 76, lead 78, now-closed switch contacts **56*d*, 56*e*, lead 132, rotor contact 134, rotor 136, through one or more of the timer resistors 130, depending at which of positions 2 through 7 the timer switch has been set, the time delay resistor 121, through leads 122, 120, now-closed contacts 56*i*, 56*j*, lead 124 through condenser 126, relay coil 46 to the return lead of said source of negative potential. The condenser thus will begin to charge through time delay resistor 121 to a negative potential value sufficient to stop conductivity of the pentode 82. Since lead 120 connecting with condenser 126 through resistor 121 is also connected through rotor 104, rotor contact 100, lead 98, now-closed switch contacts 56*a*, 56*b* and lead 80 to the grid of the pentode 82, applying a negative potential thereto, said pentode will again be cut off, resulting in closure of the switch contact 46*a*, 46*b*, and 46*c*, 46*d*, and consequent recycled operation of the tape drive mechanism as hereinabove described. The time required for the charge on condenser 126 conducted through resistor 121 and one or more of the resistors 130 in positions 3 through 7 of the selector switch, to reach a negative potential sufficient for cutting off the pentode 82** determines the delay interval between cycles of operation of the tape. Switching in more resistance by moving the timer device from position 2 to a higher position results in a greater delay interval.

It will be noted that when the motor 27 is de-energized, condenser 126 starts charging. The setting of the time delay switch 102 controls the rate of charge. The number of resistors 130 placed in the circuit will control the rate of charge. When the charge on the condenser reaches a predetermined value, the negative potential on the grid becomes sufficient to stop conduction through the tube 82 to thereby de-energize relay coil 46 to close the normally closed switches **46*a*, 46*b*, 46*c*, 46*d*, and hence to re-energize coil 56 and motor 27**.

Relay 56 when energized closes contacts **56*j* and 56*k* causing leak-off of condenser 126**.

While I have described a preferred embodiment of my invention, it is to be understood that this disclosure is for the purpose of illustration only and that various omissions or changes in arrangement of parts, as well as the substitution of equivalent elements for those herein shown and described, may be made without departing from the spirit and scope of the invention as set forth in the appended claims.

What I claim as new and desire to secure by Letters Patent is:

1. In combination with a tape carrying conductive material lengthwise and having an interruption in said conductive material, the combination comprising an electric motor, means controlled by said motor for moving the tape, circuit means for energizing said motor, a switch in said circuit means controlled by the conductive material in said tape, and means in the circuit means for deenergizing said motor to stop movement of said tape when said interruption reaches said switch.

2. The combination of claim 1, a remote switch in said circuit means, and means in said circuit means, controlled by said remote switch, operative when said remote switch is actuated after said motor has been deenergized, to reenergize said motor for again moving the tape.

3. The combination of claim 1, automatic time delay means in said circuit means, and means controlled by said time delay means to automatically reenergize said motor for moving said tape.

4. The combination of claim 1, automatic time delay means in said circuit means, and means in said circuit means controlled by said time delay means operative to automatically reenergize said motor for moving said tape after one, selectively, of a plurality of delay intervals.

5. The combination of claim 3, said means controlled by said time delay means comprising condenser means, means to start charging of the condenser means upon de-energizing the motor, means to control the rate of charge of the condenser means, and means controlled by the charge of the condenser means reaching a predetermined potential to reenergize said motor.

6. The combination of claim 5, and means to start discharging said condenser simultaneously with the reenergization of said motor.

7. In a device for controlling the movement of a record tape in a magnetic sound apparatus, the combination comprising an electric motor, a record tape, means controlled by said electric motor for moving said record tape, said tape having at one side an electrically conductive surface, said tape having a notch at one edge interrupting one side portion of said conductive surface, a pair of spaced, electrically conductive switch elements transversely disposed with respect to said tape, one of said elements being aligned with said notch, means for guiding said tape past said switch elements so that side portions of said conductive surface are in contact with said switch elements as the tape moves whereby to bridge said elements, and circuit means for energizing said motor, said switch elements being in said circuit means in series with the motor for deenergizing said motor to stop movement of the tape when a notch in the tape reaches said one of said switch elements to break the bridge across the said switch elements.

8. The combination of claim 7, a remote switch in said circuit means, and means in said circuit means and controlled by said remote switch operative when said remote switch is actuated, to reenergize said motor for again moving the record tape.

9. The combination of claim 7, automatic time delay means in said circuit means, and means in said circuit means and controlled by said automatic time delay means operatively automatically to reenergize said motor for moving said tape after one, selectively, of a plurality of delay intervals.

10. In a device for controlling stopping and recycling of a continuous recording tape of the type having an electrically conductive surface, the combination comprising an electric motor, means controlled by said electric motor for moving the record tape, a pair of spaced electrically conductive switch elements transversely disposed with respect to said tape, means for guiding said tape past said switch elements so that side portions of said conductive back surface are in contact with said switch elements as the tape moves for bridging said elements, at least one of said side portions having an interruption, and circuit means for energizing said motor for operating said tape moving means, said switch elements being in series circuit with said motor in said circuit means for deenergizing said motor to stop movement of the tape when said interruption in said conductive surface, reaches one of said switch elements and opens the circuit through said switch elements.

11. In a device for controlling stopping and recycling of a continuous recording tape of the type having an electrically conductive surface formed with an interruption, the combination comprising an electric motor, means controlled by said electric motor for moving the record tape, a pair of spaced electrically conductive switch elements transversely disposed with respect to said tape, means for guiding said tape past said switch elements so that side portions of said conductive back surface are in contact with said switch elements as the tape moves and said elements are bridged until said interruption is reached, and circuit means for energizing said motor and for deenergizing said motor to stop movement of the tape when the interruption in the tape reaches at least one of said switch elements, a remote switch in said circuit means and means operative when said remote switch is actuated to reenergize said motor for again moving the record tape.

12. The combination of claim 10, automatic time delay means in said circuit means, and means controlled by said time delay means operative automatically to reenergize said motor for moving said tape after one, selectively, of a plurality of delay intervls.

13. The device according to claim 10, wherein said circuit means comprises an electron control tube, potential circuit means conducted through said switch elements and said tape for holding the grid of said tube at cut-off potential, and a relay controlled by said tube and controlling said motor.

14. The device according to claim 11, wherein said circuit means comprises an electron control tube, potential circuit means conducted through said switch elements and said tape for holding the grid of said tube at cut-off potential, and a relay controlled by said tube and controlling said motor.

15. The device according to claim 12, wherein said circuit means comprises an electron control tube, potential circuit means conducted through said switch elements and said tape for holding the grid of said tube at cut-off potential, and a relay controlled by said tube and controlling said motor.

16. The device according to claim 15, wherein said automatic time delay means comprises a plurality of resistor-capacitor time-delay networks and rotary switch means for individually moving said time delay networks into said potential circuit means for delaying the return thereof to its tube cut-off potential value.

17. The combination of claim 13 in combination with means to limit the potential of the grid negatively beyond a predetermined value.

18. The combination of claim 2, automatic time delay means in said circuit means, and means controlled by said time delay means for automatically reenergizing said motor for again moving said tape.

References Cited in the file of this patent

UNITED STATES PATENTS

| | | |
|---|---|---|
| 2,016,506 | Maluss et al. | Oct. 8, 1935 |
| 2,686,282 | Salamonovich | Aug. 10, 1954 |

Notice of Adverse Decision in Interference

In Interference No. 91,302 involving Patent No. 2,834,928, M. A. Carter, Electronic device for controlling record tapes, final judgment adverse to the patentee was rendered April 9, 1962, as to claims 1, 2, and 11.

[*Official Gazette August 7, 1962.*]